US009669250B1

(12) United States Patent
Moore

(10) Patent No.: US 9,669,250 B1
(45) Date of Patent: Jun. 6, 2017

(54) ABDOMINAL EXERCISE BELT

(71) Applicant: David E. Moore, Hagerstown, MD (US)

(72) Inventor: David E. Moore, Hagerstown, MD (US)

( * ) Notice: Subject to any disclaimer, the term of this patent is extended or adjusted under 35 U.S.C. 154(b) by 0 days.

(21) Appl. No.: 14/721,451

(22) Filed: May 26, 2015

(51) Int. Cl.
*A63B 21/04* (2006.01)
*A63B 21/055* (2006.01)
*A63B 21/16* (2006.01)
*A63B 23/02* (2006.01)

(52) U.S. Cl.
CPC .......... *A63B 21/0557* (2013.01); *A63B 21/04* (2013.01); *A63B 21/1609* (2015.10); *A63B 23/0205* (2013.01)

(58) Field of Classification Search
CPC .......... A63B 21/0004; A63B 21/00043; A63B 21/00178; A63B 21/00185; A63B 21/002; A63B 21/0023; A63B 21/04; A63B 21/0407; A63B 21/0414; A63B 21/0421; A63B 21/0428; A63B 21/0435; A63B 21/0442; A63B 21/045; A63B 21/055; A63B 21/0552; A63B 21/0555; A63B 21/0557; A63B 21/065; A63B 21/068; A63B 21/08; A63B 21/16; A63B 21/1609; A63B 21/4007; A63B 21/4009; A63B 21/4023; A63B 21/4025; A63B 21/4039; A63B 21/4043; A63B 23/02; A63B 23/0205; A63B 23/0211; A63B 23/0233; A63B 23/0238; A63B 69/0057; A63B 69/0059; A63B 2208/0228; A63B 2208/0233; A63B 2209/02; A63B 2209/023; A63B 2209/026; A63B 2209/14; A63B 2225/09; A63B 2225/093; Y10T 403/29; Y10T 403/45
See application file for complete search history.

(56) References Cited

U.S. PATENT DOCUMENTS

| | | | |
|---|---|---|---|
| 1,759,719 A * | 5/1930 | Spino | F16F 1/125 267/74 |
| 2,220,593 A | 11/1940 | Watson | |
| 3,278,185 A | 10/1966 | Bidopia et al. | |

(Continued)

FOREIGN PATENT DOCUMENTS

WO 2008016275 A1 2/2008

OTHER PUBLICATIONS http://www.collagevideo.com/workout-video/10-Minute-Solution-Belly-Butt--Thigh-Blasters-5721?gclid=CJfekNPnzbgCFdGj4Aodp3QA2g (Jul. 28, 2009).

(Continued)

*Primary Examiner* — Stephen Crow
*Assistant Examiner* — Gary D Urbiel Goldner
(74) *Attorney, Agent, or Firm* — Robert C. Montgomery; Montgomery Patent & Design, LP.

(57) ABSTRACT

An apparatus adapted to function as an exercise belt having two (2) adjustable ends formed as hooks and operable to be secured about sides of a chair or a seat in a motor vehicle. The adjustable ends further include a threaded means to allow both adjustable ends or either adjustable end to be threaded in or out to achieve a desired length. The desired length is selectively adjustable so that a user may isometrically push against the exercise belt while seated and have the exercise belt provide resistance to exertion provided by the user.

12 Claims, 3 Drawing Sheets

(56) References Cited

U.S. PATENT DOCUMENTS

| | | | | |
|---|---|---|---|---|
| 3,313,046 | A | * | 4/1967 | Darr .................... A43B 5/0454 24/69 SK |
| 3,332,116 | A | * | 7/1967 | Werner .................. A43B 3/00 29/517 |
| 3,401,978 | A | * | 9/1968 | Wrigglesworth .... A47D 13/105 297/274 |
| 3,551,959 | A | * | 1/1971 | Mastalski ............... F16G 11/04 174/79 |
| 5,141,482 | A | * | 8/1992 | Hern .................. A63B 21/0552 482/123 |
| 5,158,510 | A | * | 10/1992 | Lemire ............. A63B 21/4001 482/51 |
| 5,522,401 | A | | 6/1996 | Brucker |
| 5,743,838 | A | * | 4/1998 | Willis ................ A63B 21/0552 482/124 |
| 5,882,284 | A | | 3/1999 | Cayne |
| 5,913,757 | A | | 6/1999 | Winters |
| 6,063,012 | A | * | 5/2000 | Berkowitz ......... A63B 21/0552 482/121 |
| 6,500,103 | B2 | | 12/2002 | Porter |
| 7,044,896 | B2 | | 5/2006 | Hetrick |
| 7,083,555 | B1 | | 8/2006 | McPartland |
| 7,278,960 | B1 | * | 10/2007 | McGibbons ....... A63B 21/0004 482/140 |
| 7,935,036 | B2 | * | 5/2011 | Haynes ............. A63B 21/4025 482/121 |
| 8,317,667 | B1 | * | 11/2012 | Thomas ............. A63B 21/0555 482/121 |
| 8,602,950 | B2 | * | 12/2013 | Savarino ............. A63B 21/023 267/179 |
| 8,784,230 | B1 | * | 7/2014 | Mitchell ........... A63B 69/0057 473/271 |
| 2005/0113220 | A1 | * | 5/2005 | Dovner ............. A63B 21/0004 482/121 |
| 2005/0113221 | A1 | * | 5/2005 | Dovner ............. A63B 21/0004 482/121 |
| 2005/0113222 | A1 | * | 5/2005 | Dovner ............. A63B 21/0004 482/121 |
| 2005/0113223 | A1 | * | 5/2005 | Dovner ............. A63B 21/0004 482/121 |
| 2005/0113224 | A1 | * | 5/2005 | Dovner ............. A63B 21/0004 482/121 |
| 2005/0113225 | A1 | * | 5/2005 | Dovner ............. A63B 21/0004 482/121 |
| 2006/0116251 | A1 | * | 6/2006 | Oz ........................ A47C 9/002 482/91 |
| 2006/0199711 | A1 | * | 9/2006 | Miers ................ A63B 21/0552 482/124 |
| 2008/0103032 | A1 | * | 5/2008 | Jacob ................ A63B 21/4009 482/124 |
| 2010/0204014 | A1 | * | 8/2010 | Hoffman ............. A63B 21/055 482/8 |
| 2010/0216613 | A1 | * | 8/2010 | Pacini ................ A63B 21/0552 482/122 |
| 2011/0230314 | A1 | * | 9/2011 | Hoffman ............. A63B 21/055 482/51 |
| 2011/0247127 | A1 | * | 10/2011 | Pou .................... A41D 13/0012 2/227 |
| 2011/0319235 | A1 | * | 12/2011 | Garrett ............ A63B 21/00065 482/105 |
| 2012/0245001 | A1 | | 9/2012 | Mandel |
| 2013/0331242 | A1 | * | 12/2013 | Wilson ............... A63B 21/0004 482/126 |
| 2014/0274613 | A1 | * | 9/2014 | DeMarco ............ A63B 21/068 482/139 |
| 2014/0289939 | A1 | * | 10/2014 | Omer .................... A63B 71/12 2/463 |

OTHER PUBLICATIONS http://www.b2bage.com/product-physical-therapy-equipments/1096663/waist-band-belt-exercise-tummy-trimmer-lady-body-sharper.html (Apr. 22, 2012).
http://i00.i.aliimg.com/img/pb/973/976/417/417976973_612.jpg (Jan. 21, 2013).
http://www.abbeltx.com/finding-the-best-ab-belt-for-women/ (May 1, 2012).

* cited by examiner

ABDOMINAL EXERCISE BELT

RELATED APPLICATIONS

None.

FIELD OF THE INVENTION

The present invention relates generally to an exercise belt operable to be secured about the sides of a seat or chair for resistance exercise for a seated user.

BACKGROUND OF THE INVENTION

Physical fitness and health considerations are areas of highest concern among people today. More than ever, people are frequenting health clubs and performing exercise routines at home in order to lose weight, improve muscle tone, and maintain a healthy lifestyle. Many people are turning to exercise machines such as treadmills, weight machines, stationary bicycles, and the like to help in these endeavors. However, most exercise enthusiasts lead a busy life consisting of work, family, sports, and other personal and professional obligations. Which means even if a person desires to exercise, he or she may nevertheless not be able to do so because there is no time available. Therefore being able to make time to exercise is critical.

Many people spend a great deal of their daily lives driving motor vehicles, whether running errands or commuting to and from work. This time is often considered wasted in that the time must be specifically allocated to motor vehicle operation or sitting as a passenger. This situation is unfortunate because for many people the time spent in motor vehicles getting to and from a given destination represents more than enough time for a daily exercise regimen. Unfortunately, even for a passenger, the confining nature of a motor vehicle makes such exercise nearly impossible. Accordingly, there exists a need for a means by which exercise routines can be safely performed in a motor vehicle. The use of the exercise belt allows drivers and passengers of motor vehicles to perform abdominal exercise routines, in a manner which is not only quick, easy, and effective, but also safe.

SUMMARY OF THE INVENTION

The inventor has recognized the aforementioned issues and inherent problems and observed that there is a lack in the prior art for an abdominal exercise belt that may be utilized in an automobile vehicle.

It is therefore an object of the invention to provide an abdominal exercise belt which is composed of a belt assembly, a padded section affixed to the belt assembly and a pair of hook assemblies. At the distal end of each hook assembly is a means for adjustably lengthening a distance between a respective hook assembly and belt assembly. The cover and elastic member of the exercise belt is composed of a substance which is suitable for repeated expansion and retraction.

It is therefore an object of the invention to provide an abdominal exercise belt the distal ends of the exercise belt assembly taper down to a terminal portion. Each hook assembly is comprised of a hook anchor, a cap and a hook. In at least one (1) embodiment each anchor is a cylindrical metal form and has a female threaded region at a distal end thereof, and each hook has a male threaded region at a distal end thereof. In at least one (1) embodiment, the cap is a half-cylindrical metal form with an aperture located through the middle of the closed end thereof and secured over the distal end of the hook anchor.

It is therefore another object of the invention to provide an abdominal exercise belt the padded section of the exercise belt is covered in a textile suitable for repeated expansion and retraction. The material within the textile covering is made of a memory or general foam material, a gel material, or natural or synthetic fibers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
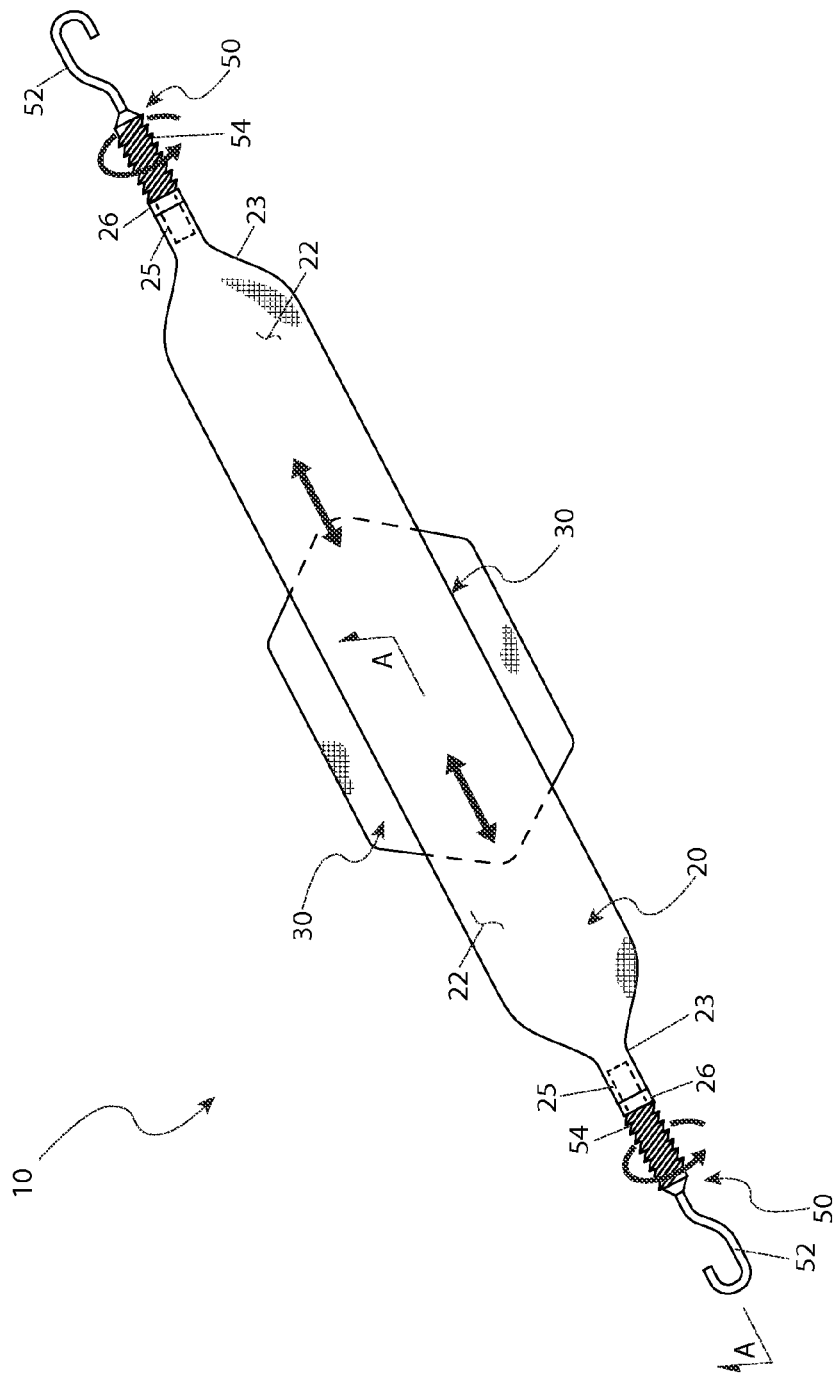
FIG. 1 is a top view of an abdominal exercise belt 10, according to a preferred embodiment of the present invention.
Figure 2:
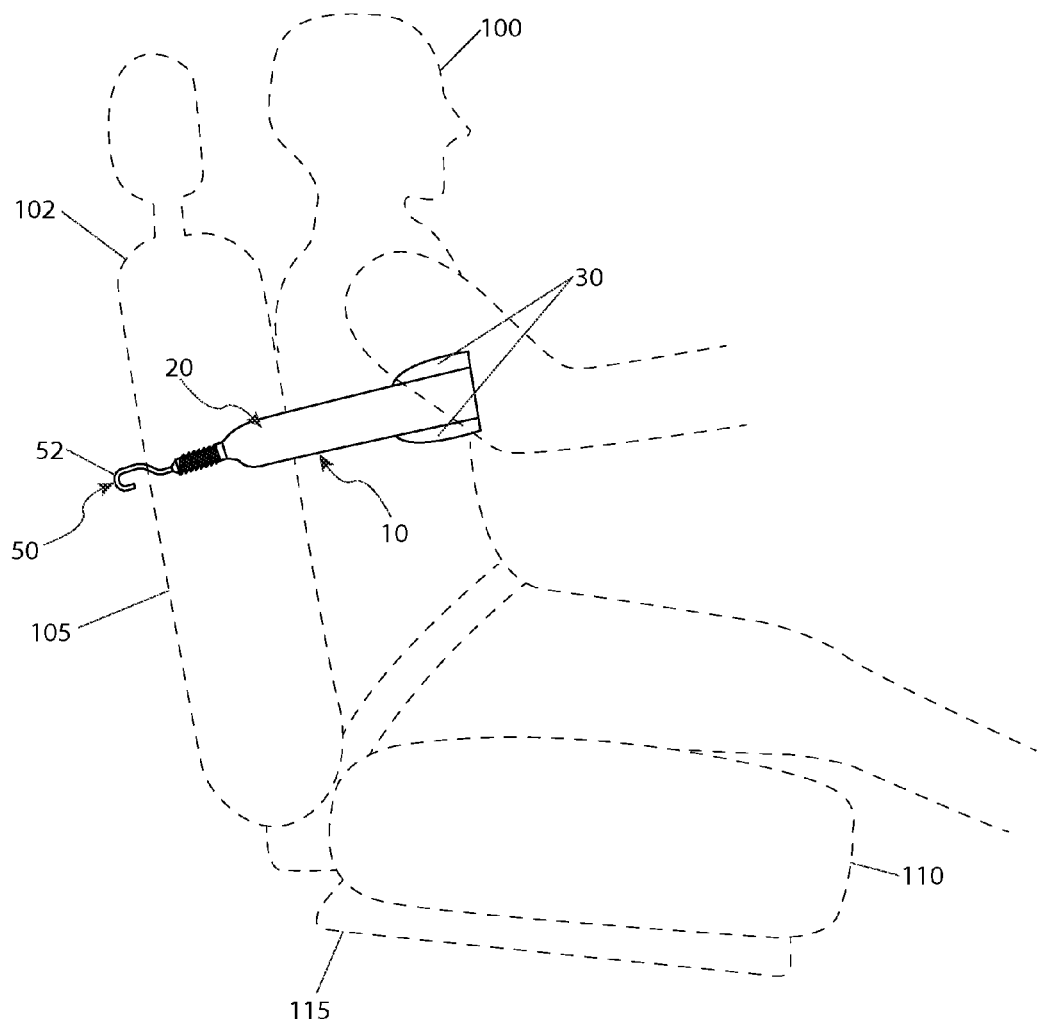
FIG. 2 is an environmental view of the abdominal exercise belt 10 depicting an in-use state within a vehicle, according to a preferred embodiment of the present invention; and, FIG. 3 is a sectional view of the abdominal exercise belt 10 taken along section line A-A (see FIG. 1), according to a preferred embodiment of the present invention.
Figure 3:
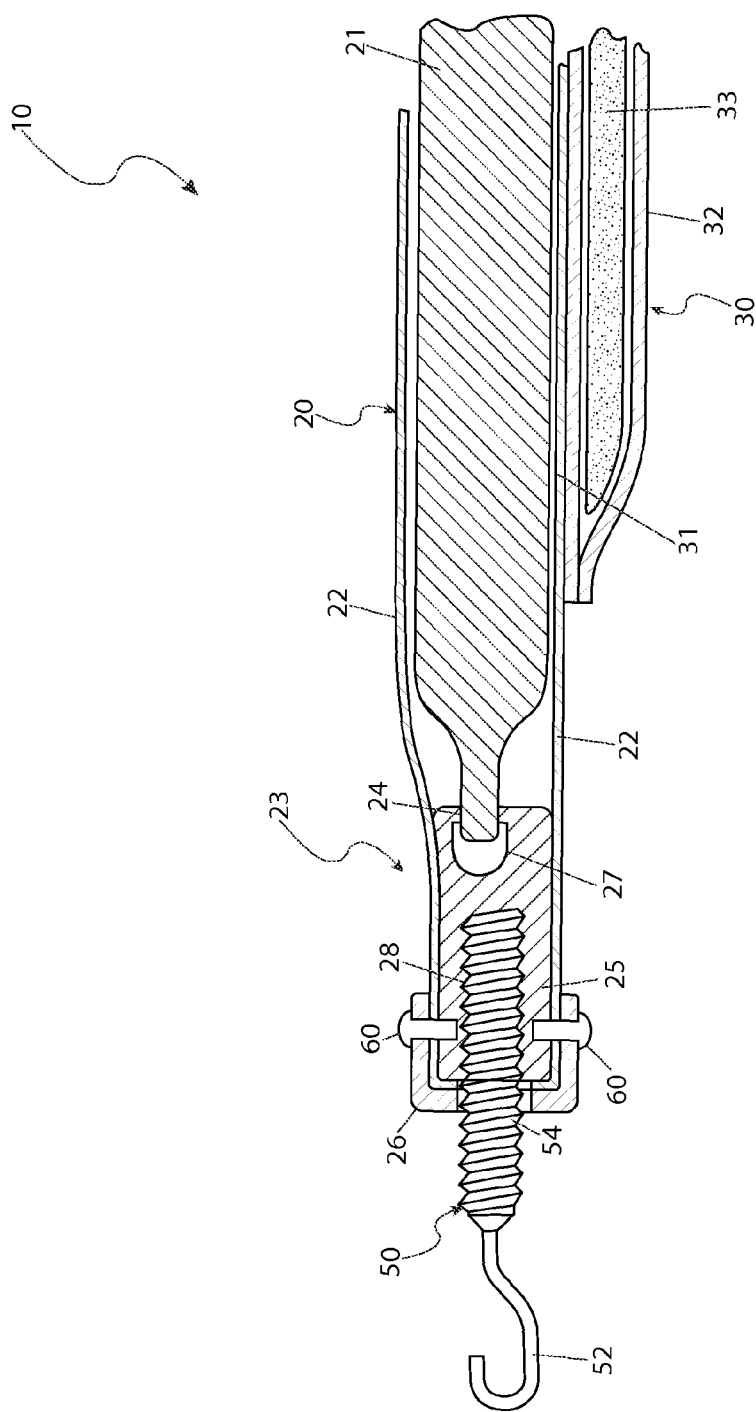

DESCRIPTIVE KEY 10 abdominal exercise belt
20 belt assembly
21 elastic member
22 cover
23 neck
24 loop
25 hook anchor
26 cap
27 eyelet
28 female threaded region
29 cap aperture
30 center section
31 top layer
32 bottom layer
33 padding
50 hook assembly
52 hook
54 male threaded region
60 fastener
100 user
102 seat
105 seat back
110 seat bottom
115 seat frame The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an abdominal exercise belt (herein described as the "apparatus") 10, which provides a means to perform an abdominal workout while seated within a motor vehicle. The length of the apparatus 10 is adjusted to match a size of the user's chest or waistline and then removably attached to an existing vehicle seat 105, 110. Once in place, the user may perform abdominal exercises such as, but not limited to: crunches, flexing exercises, and the like, while in use with a seat 105 within a vehicle. The apparatus 10 allows for the safe operation of a motor vehicle while the user 100 flexes his or her abdominal muscles, against the apparatus 10 to obtain an abdominal workout.

Referring now to FIG. 1, a top view of the apparatus 10, according to a preferred embodiment of the present invention, is disclosed. The apparatus 10 provides a flexible linear assembly approximately four inches (4 in.) wide and eighteen to twenty-four inches (18-24 in.) long which includes a elastic belt assembly 20 having an internal elastic member 21 (see FIG. 3), and a hook assembly 50 attached to each end portion which in turn provides length-adjustable securement of the apparatus 10 to stationary portions of an existing vehicle seat. The apparatus 10 also provides a wider padded center section 30 which is aligned with, and comfortably covers the abdominal area of the user 100.

Referring now to FIG. 2, an environmental view of the apparatus 10 depicting an in-use state within a vehicle, according to a preferred embodiment of the present invention, is disclosed. The apparatus 10 is shown here being secured using hook assemblies 50 (one (1) is shown here), affixed to a rear portion of a seat back portion 105 of a motor vehicle and extending across a chest area of the user 100. It is understood that the use of the apparatus 10 is not limited to the illustrated usage and may also be mounted at various portions of the seat back 105, seat cushion 110, seat frame 115, and the like, and extended across waist or leg portions of the user 100 to perform additional resistance-type exercises. Additionally, it is envisioned that the apparatus 10 may also be affixed about side portions of a normal chair to perform exercises, and as such should not be interpreted as a limiting factor of the apparatus 10.

Referring now to FIG. 3, a sectional view of the apparatus 10 taken along section line A-A (see FIG. 1), according to a preferred embodiment of the present invention, is disclosed. The belt assembly portion 20 of the apparatus 10 includes an internal elastic member 21 having a textile cover 22. It is envisioned that a plurality of models of the apparatus 10 would be introduced having elastic members 21 which provide varying amounts of resistance based upon a user's 100 capabilities and preference.

Each end portion of the belt assembly 20 tapers down to a neck 23 having a general cylindrical shape and includes a hook assembly 50 which is adjustably connected to an end portion of the elastic member 21. Each hook assembly 50 provides a means to attach the apparatus 10 to the vehicle seat 102, and is made up of a hook anchor 25, a cap 26, and a hook 52.

Each end of the elastic member 21 provides an integrally-molded loop 24 which passes through around or ovular eyelet portion 27 located at a proximal end of each hook anchor 25. The hook anchors 25 provide cylindrical metal forms also having center female threaded regions 28 at distal ends which provide threaded attachment of respective integral male threaded regions 54 of each hook 52, thereby providing a strong and adjustable connection between the elastic member 21 and the hooks 52. The overall length of the belt assembly 20 is to be adjustable between approximately eighteen and twenty-four inches (18-24 in.) by varying an amount of threaded engagement of the female 28 and male 54 threaded regions of the hook assemblies 50. Each hook 52 is approximately two inches (2 in.) in diameter and encompasses an angle of approximately two-hundred and seventy degrees) (270°).

The distal end of each hook anchor 25 is covered by a half-cylinder-shaped metal cap 26 which aesthetically covers and secures an end portion of the cover 22 against the hook anchor 25. The cap 26 has an aperture 29 and is affixed to the hook anchor 25 using a plurality of fasteners 60 such as rivets or an equivalent fastening means.

A padded center section 30 is sewn or otherwise affixed to a bottom surface of the belt assembly 20 at an intermediate position to provide comfort to a user 100 during use. The center section 30 is located along a bottom surface of the belt assembly 20 and extends perpendicularly outward from each side of the belt assembly 20 approximately two to four inches (2-4 in.). The center section 30 includes a sewn textile assembly including a top layer 31 which is affixed to the belt assembly 20, and a bottom layer 32. A layer of foam padding 33 is sandwiched in between. In at least one (1) embodiment the padded section is made of a memory foam material. In at least a second (2) embodiment the padded section is made of a gel material. In at least a third (3) embodiment the padded section is made of natural or synthetic fibers.

The cover portion 22 of the belt assembly 20, and the top 31 and bottom 32 layers of the center section 30, are envisioned to provide elastic fabric materials such as spandex, cotton stretch material, or the like, capable of stretching with the elastic member 21 during the performance of the abdominal exercises. Furthermore, the cover 22, and the top 31 and bottom 32 layers of the center section 30 are envisioned to be introduced in various attractive colors and patterns based upon a user's 100 preference.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 2.

The method of installing and utilizing the apparatus 10 may be achieved by performing the following steps: procuring a model of the apparatus 10 having a desired external appearance as well as an elastic member 21 which provides a desired resistance; adjusting an overall length of the apparatus 10 by rotating one (1) or both hooks 52 to vary engagement of the female 28 and male 54 threaded regions of the hook assemblies 50, until obtaining a desired length; attaching the hooks 52 to opposing side portions of the vehicle seat 102; performing an abdominal workout including exercises such as crunches, flexing exercises, and the like while in a seated position within a motor vehicle; and, benefiting from an efficient use of time by performing abdominal exercises while occupying a vehicle afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An exercise belt, comprising:
    a belt assembly having a cover covering an elastic member having a loop disposed at each distal end of said elastic member;
    a padded section affixed to said belt assembly; and,
    a pair of hook assemblies respectively attached to distal ends of said belt assembly and further comprising a threaded means for adjustably lengthening a distance between a respective hook assembly and said belt assembly, each said hook assembly comprising:
        a hook anchor having a cylindrical metal form and having a center female threaded region at a distal end and an eyelet at a proximal end thereof;
        a cap; and,
        a hook having a male threaded region at a distal end thereof;
    wherein each said loop at each distal end of said elastic member is integrally connected to a respective said eyelet of said hook anchor; and,
    wherein each said male threaded region threadingly engages with each respective said female threaded region of said hook anchor;
    wherein rotation of either said hook assembly, in a clockwise direction, shortens said distance between each said respective hook assembly and said belt assembly;
    wherein rotation of either said hook assembly, in a counter-clockwise direction, lengthens said distance between each said respective hook assembly and said belt assembly; and,
    wherein each hook assembly is adapted to affix said exercise belt to a support structure.

2. The exercise belt of claim 1, wherein said cover is suitable for repeated expansion and retraction.

3. The exercise belt of claim 1, wherein said elastic member is suitable for repeated expansion and retraction.

4. The exercise belt of claim 1, wherein said distal ends of said belt assembly each taper down to a terminal portion.

5. The exercise belt of claim 1, wherein said cap is a half-cylindrical metal form with an aperture located in a middle of a closed end thereof.

6. The exercise belt of claim 5, wherein said cap is fastened and secured over said distal end of said hook anchor thereof.

7. The exercise belt of claim 1, wherein said padded section comprises a foam layer having a first side affixed to a top layer, and an opposing second side affixed to a lower layer.

8. The exercise belt of claim 7, wherein said top layer is suitable for repeated expansion and retraction.

9. The exercise belt of claim 8, wherein said lower layer is suitable for repeated expansion and retraction.

10. The exercise belt of claim 1, wherein said padded section is composed of a memory foam material.

11. The exercise belt of claim 1, wherein said padded section is composed of a gel material.

12. The exercise belt of claim 1, wherein said padded section is composed of natural or synthetic fibers.

* * * * *